(12) United States Patent
Figura et al.

(10) Patent No.: US 6,179,075 B1
(45) Date of Patent: Jan. 30, 2001

(54) VEHICLE DRIVE/SUSPENSION SYSTEM

(76) Inventors: William L. Figura, 2649 N. Shore Dr., Chetek, WI (US) 54728; Daniel Selleck, 2070 16th Ave., Cameron, WI (US) 54822

( * ) Notice: Under 35 U.S.C. 154(b), the term of this patent shall be extended for 0 days.

(21) Appl. No.: 09/360,493

(22) Filed: Jul. 23, 1999

(51) Int. Cl.[7] .............................. B60G 5/02; B62D 61/10
(52) U.S. Cl. .................................. 180/24.11; 180/24.04; 280/677
(58) Field of Search .................. 180/24.11, 24.12, 180/24.05, 24.04; 280/678, 677, 679, 680, 681

(56) References Cited

U.S. PATENT DOCUMENTS

| | | |
|---|---|---|
| 1,608,069 | 11/1926 | Lacey et al. . |
| 1,627,225 * | 5/1927 | Babel et al. ........................ 180/24.11 |
| 1,839,785 | 1/1932 | Church . |
| 1,850,942 * | 3/1932 | Rockwell ........................ 180/24.11 |
| 1,921,660 | 8/1933 | Church . |
| 2,017,001 * | 10/1935 | Hocking ........................ 180/24.11 |
| 2,018,862 | 10/1935 | Meyer . |
| 2,250,372 * | 7/1941 | Hacker ........................ 180/24.05 |
| 2,280,741 | 4/1942 | Bolster et al. . |
| 2,465,181 * | 3/1949 | Williams et al. ................. 180/24.11 |
| 2,479,327 * | 8/1949 | Bouble ................. 180/24.11 |
| 2,492,126 * | 12/1949 | Collender ........................ 180/24.11 |
| 3,370,665 * | 2/1968 | Stanaback ........................ 180/24.11 |
| 3,446,302 * | 5/1969 | Schoonover ........................ 180/24.11 |
| 3,603,423 * | 9/1971 | Schoonover ........................ 180/24.11 |
| 3,972,379 | 8/1976 | Norris . |
| 4,235,297 | 11/1980 | Porta . |
| 4,535,860 * | 8/1985 | Waggoner ........................ 180/24.05 |
| 4,946,193 | 8/1990 | Oka . |
| 5,215,160 | 6/1993 | Williams et al. . |
| 5,290,201 * | 3/1994 | Tesker ........................ 180/24.11 |
| 5,417,297 * | 5/1995 | Auer ........................ 180/24.11 |
| 5,573,300 | 11/1996 | Simmons . |
| 5,584,776 | 12/1996 | Weilant et al. . |
| 5,690,002 | 11/1997 | Showalter . |

OTHER PUBLICATIONS

John Deere *Gator Utility Vehicles* Brochure Jan. 1997.
CheTech *Groundforce 100 Features & Specifications* Brochure Undated.

* cited by examiner

*Primary Examiner*—Lanna Mai
*Assistant Examiner*—Ruth Ilan
(74) *Attorney, Agent, or Firm*—Schnader Harrison Segal & Lewis LLP

(57) ABSTRACT

The invention is directed to a vehicle drive/suspension system that has a chassis having a front and rear portion and a pair of sides. A drive axle has opposed end portions and extends between the sides. Each side has a pivotally mounted elongated rocker arm that is connected to the corresponding end portion of the drive axle. Pivot mounts and pivot plates are used for this attachment. The rocker arms have sprockets mounted to each end. These sprockets are chain driven by drive sprockets located at each end of the drive axle. Tension sprockets are slidably mounted onto each rocker arm. Also associated with each rocker arm is a damper, and a rubber stop member. It is preferred that the pivot location of each pivot mount is away from the center point of the rocker arm.

23 Claims, 6 Drawing Sheets

VEHICLE DRIVE/SUSPENSION SYSTEM

FIELD OF THE INVENTION

This invention relates to a vehicle drive/suspension system, particularly to a drive/suspension system for four-wheel drive all-terrain/utility type vehicles.

BACKGROUND OF THE INVENTION

All-terrain/utility type vehicles are known in the art and have been utilized for many years. Typical of these types of vehicles are Gator® utility vehicles manufactured by John Deere Company and "Groundforce 100" manufactured by CheTech Company. Such vehicles have a wide variety of applications including industrial, governmental and private uses. Such vehicles have historically required heavy duty construction, the ability to negotiate rough terrain, ability to haul heavy loads, provide high ground clearance and provide a safe, reliable vehicle for the operator and, typically, at least one passenger.

Recently, there has been a trend toward more frequent use of such vehicles under circumstances wherein they traverse ground or terrain that should not be disturbed or broken. Typical uses include landscaping and/or maintaining lawns or the grounds of office parks, etc. and golf courses, for example. Such uses oftentimes require that the turf underfoot not be disturbed or "scuffed." Also, such uses often require operation in tight spaces that require comparatively tight turns, which exacerbates turf "scuffing."

Prior vehicles have tended to disturb the grounds such as by turf "scuffing" or destruction of the ground underfoot. This phenomenon has especially been a problem with respect to scuffing during turning of such all-terrain/utility type vehicles, especially four-wheel drive vehicles since they tend to disturb the turf much in the same way as treads on a military tank. This is especially important in relation to six-wheeled vehicles because the front wheels are not powered (as in a 4×4 vehicle), the front wheels do not contribute to turf "scuffing." However, the effect of the four rear drive wheels is exacerbated.

Safety is also an important issue in six- or eight-wheeled vehicles with axles mounted rigidly to the frame. This is clearly illustrated when such a vehicle climbs the crest of a hill or gully. The front wheels continue to climb, loosing contact with the ground until the vehicle progresses far enough that the center of gravity shifts and the vehicle "teeters", slamming down on the front wheels (the rear wheels coming off the ground in the process), much like a tracked vehicle would be expected to perform. Accordingly, it has been a longstanding desire to manufacture an all-terrain/utility type vehicle that is capable of meeting the traditional requirements of such vehicles but also provide operator safety, high ground clearance, facilitate ease of turning and reduce and/or eliminate turf "scuffing."

SUMMARY OF THE INVENTION

One aspect of the invention is directed to a vehicle drive/suspension system including a chassis having a front portion, a rear portion and a pair of sides; a drive axle having opposed end portions extending between said sides; an elongated rocker arm, having opposed end portions, connected to each of said opposed end portions of said drive axle and pivotally mounted to each of said sides substantially at said opposed end portions of said drive axle; a sprocket rotatably fixed to each of said opposed end portions of said rocker arms; a rotatable drive sprocket connected to each of said opposed end portions of said drive axle; and a drive link for each rocker arm connected to rotate said sprockets in conjunction with said drive sprockets.

Another aspect of the invention is directed to a vehicle drive/suspension system including a chassis having a front portion, a rear portion and a pair of sides; a drive axle having opposed end portions extending between said sides; an elongated rocker arm having opposed end portions and a pivot point pivotally mounted to each of said sides at said pivot points and connected to said opposed end portions of said drive axle, said pivot points being located at positions other than middle points along the length of said rocker arms; a sprocket rotatably fixed to each of said opposed end portions of said rocker arms; a rotatable drive sprocket connected to each of said opposed end portions of said drive axle; and a drive link for each rocker arm connected to rotate said sprockets in conjunction with said drive sprocket.

DETAILED DESCRIPTION OF THE INVENTION

Figure 1:
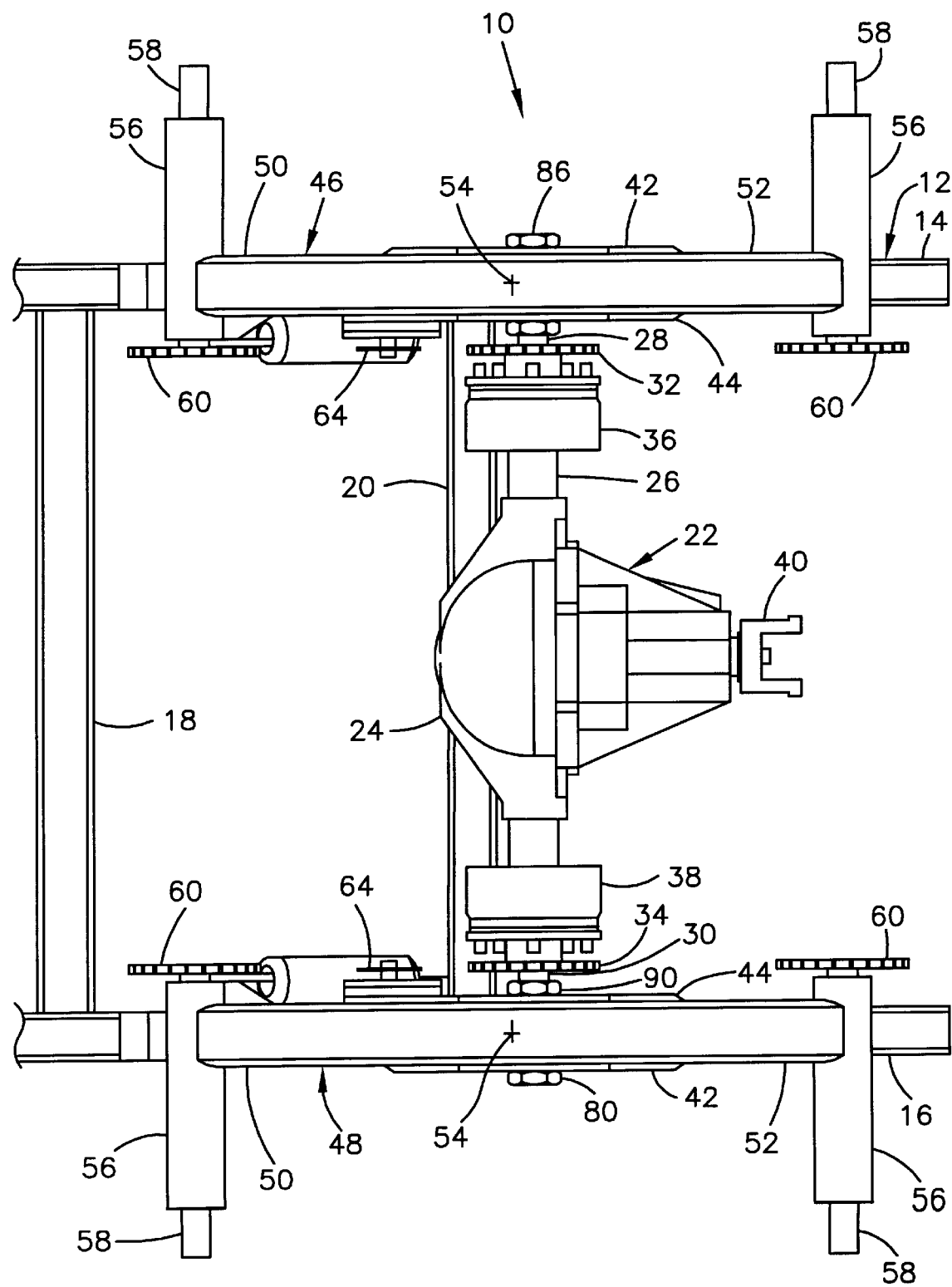
FIG. 1 is a bottom plan view of portions of a drive/suspension system in accordance with aspects of the invention.
Figure 2:
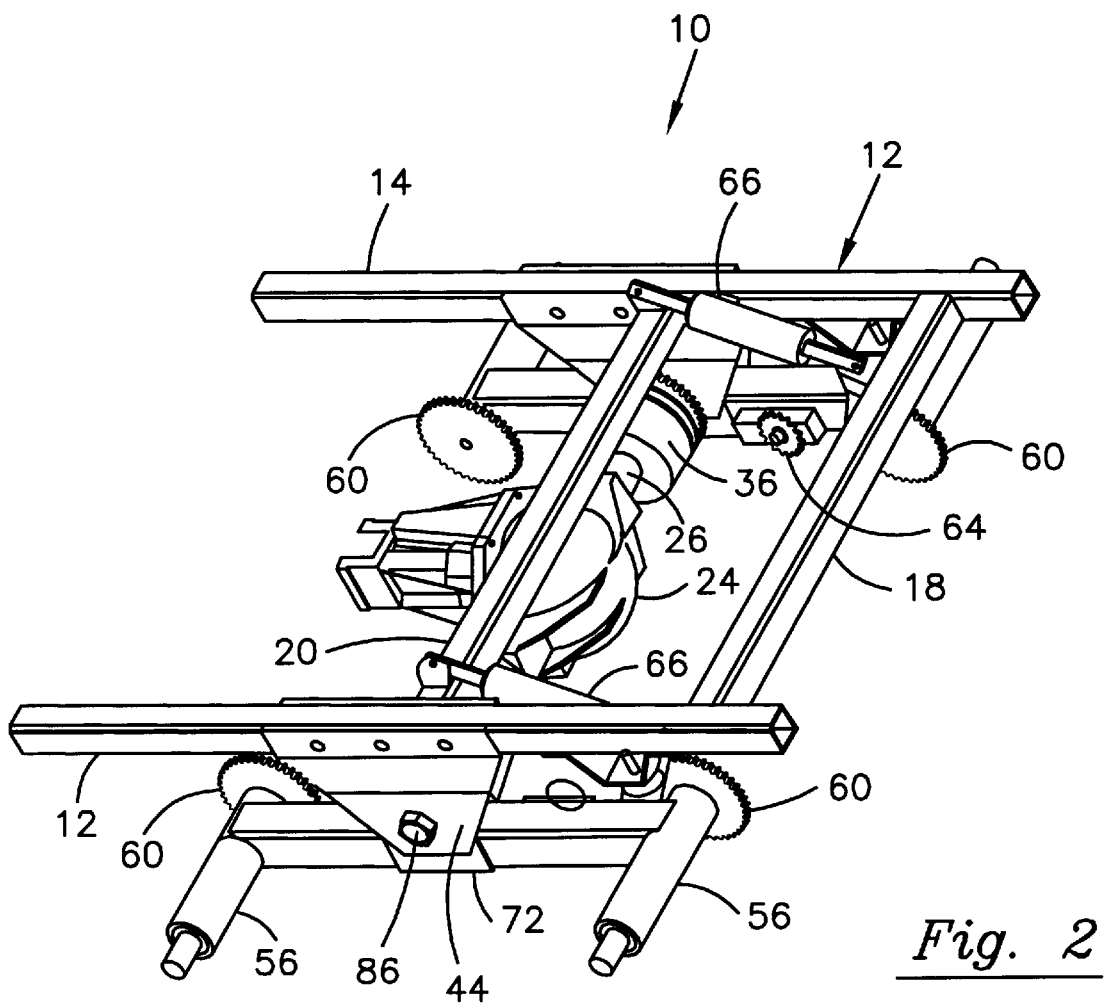
FIG. 2 is a perspective view of the drive/suspension system shown in FIG. 1 taken from the rear and above.

It will be appreciated that the following description is intended to refer to specific embodiments of the invention selected for illustration in the drawings and is not intended to define or limit the invention other than in the appended claims.

Referring now to the drawings generally, a vehicle drive/suspension system 10 is shown. Chassis 12 includes sides 14 and 16, rear-cross member 18 which generally defines a rear portion, and a middle-cross member 20. No front cross portion is shown. However, a front-cross member is typically included at the front portion. For example, a steering axle is typically mounted to the front of the vehicle chassis. Such front wheels would not typically be drive wheels. A drive axle 22 connects between sides 14 and 16. Drive axle 22 includes an axle housing 24 and an elongated axle shaft 26 having opposed portions 28 and 30. Affixed to axle shaft 26 are a pair of drive sprockets 32 and 34. A pair of brakes 36 and 38 are also mounted to axle shaft 26 inwardly of drive sprockets 32 and 34. Preferably, brakes 36 and 38 are drum type brakes, although they can be other types of brakes such as disc brakes and the like.

Axle housing 24 contains typical gear apparatus well known in the art and not described herein that connects to universal joint 40 which, in turn, connects to a drive shaft (not shown).

It should be understood that the axle is not limited to being driven by a coupled drive shaft as shown. For example, it may also be driven by a belt-engaged torque converter clutch. The drawings show an axle with a universal joint 40 for simplicity of illustration. Different axles may be used such as an axle with a stub shaft that a driven torque-converter clutch is mounted to. There may also be an additional mounting point between the axle and the chassis to help stabilization.

Figure 5:
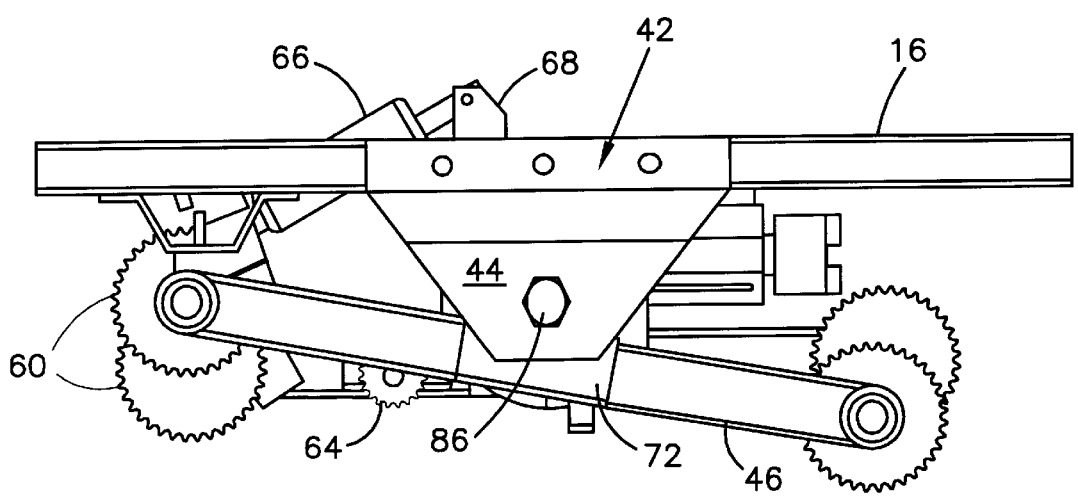
FIG. 5 is a side elevational view of the drive/suspension system from FIG. 1.
Figure 6:
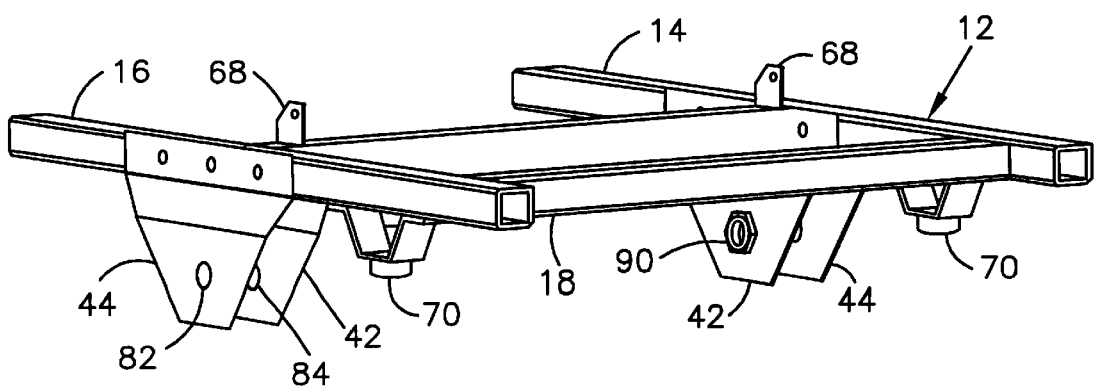
FIG. 6 is a perspective view of a portion of a chassis taken from the drive/suspension system in accordance with the invention.

As best shown in FIGS. 5 and 6, a pair of mounting plates 42 and 44 are affixed to each of side rails 14 and 16 and extend downwardly toward elongated rocker arms 46 and 48.

The rocker arms 46 and 48 have opposed end portions 50 and 52 and a center point 54, which is equidistant between the opposed end portions 50 and 52. Each opposed end portion 50 and 52 connects to a sealed bearing housing 56. The sealed bearing houses 56 have axles 58 onto which wheels (not shown) may be mounted.

Figure 4:
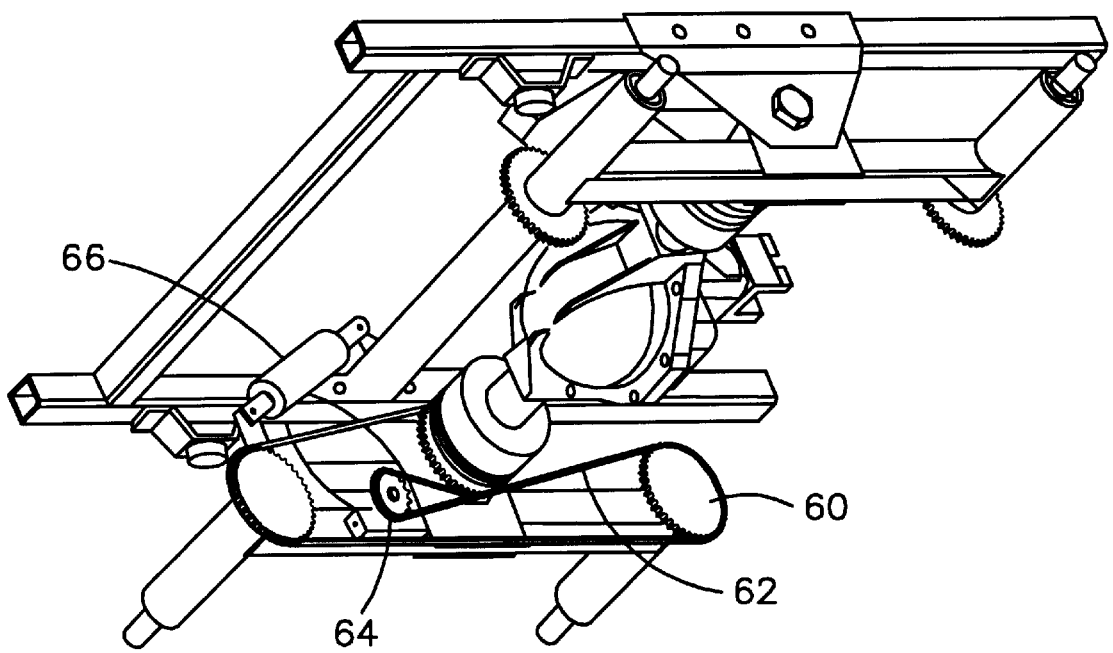
FIG. 4 is a perspective view of the drive/suspension system shown in FIG. 1 from the rear and below and further showing a drive chain utilized in accordance with aspects of the invention.
Figure 7:
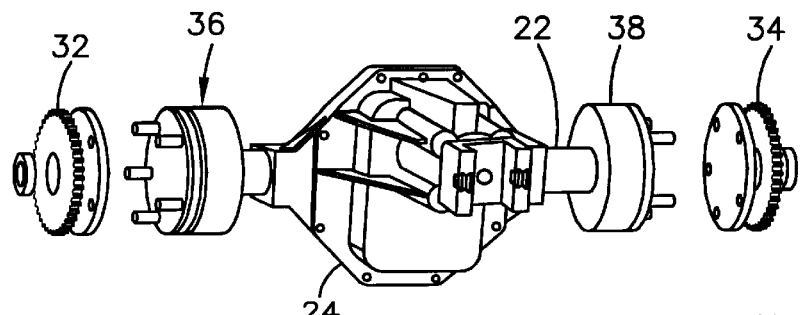
FIG. 7 is a perspective view of a drive axle in accordance with aspects of the invention having several parts broken away for ease of understanding.

On each inboard end of axle 58 is mounted a sprocket 60 to which drive chains 62 as shown in FIG. 4 are connected. Each pair of sprockets 60 on rocker arms 46 and 48 is linked to corresponding drive sprockets 32 and 34. Tension sprockets 64 are slidably mounted onto rocker arms 46 and 48, respectively. Tension sprockets 64 may be utilized to facilitate changing of chains 62.

A dampener 66 in the form of a shock absorber connects between each of the rocker arms 46 and 48 and chassis 12 by a connection 68 mounted on cross member 20. Connectors 68 are best shown in FIG. 6.

Rubber stops 70 are mounted to the underside of side rails 14 and 16 at the rearward portion of chassis 12 and are positioned in alignment with rocker arms 46 and 48. Rubber stop members 70 prevent rocker arms 46 and 48 from pivoting upwardly and into contact with side rails 14 and 16, respectively.

Figure 3:
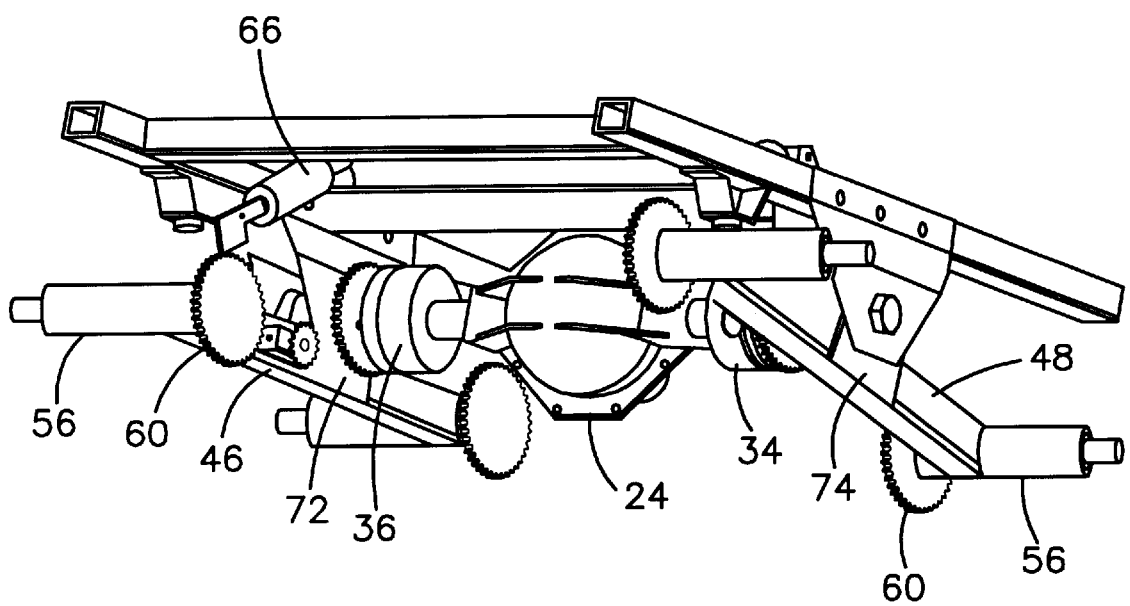
FIG. 3 is a perspective view of the drive/suspension system from FIG. 1 shown from the rear and below.
Figure 8:
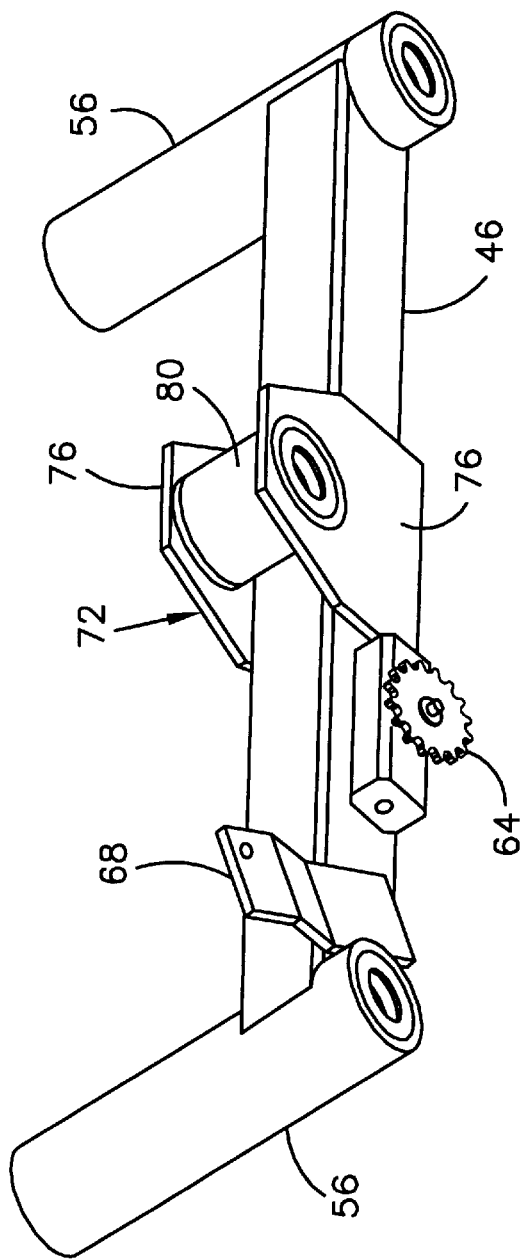
FIG. 8 is a perspective view of a rocker arm in accordance with aspects of the invention.
Figure 9:
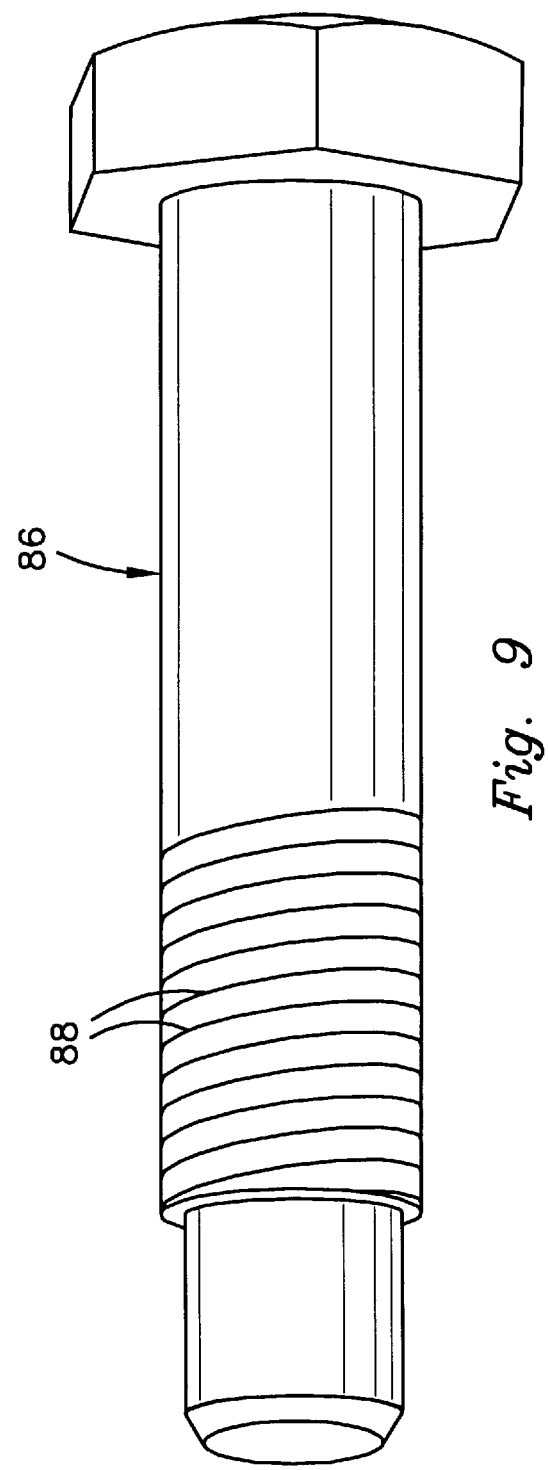
FIG. 9 is a perspective view of a pivot pin utilized in accordance with aspects of the invention.

As best shown in FIGS. 3 and 8, rocker arms 46 and 48 have pivot mounts 72 and 74. Each pivot mount is comprised of a pair of upwardly extending plates 76 and 78 extending upwardly therefrom and include a sealed bearing housing 80. Sealed bearing housing 80 is aligned with the central axis of axle shaft 26 and openings 82 and 84 in mounting plates 42 and 44 such that rocker pin 86 extends through mounting plate 44, mounting plate 76, sealed bearing housing 80, mounting plate 78 and through the opening in axle shaft 26. The threads 88 of rocker pin 86 engage nut 90 that is welded to mounting plate 42 to secure the rocker arms 46 and 48 to chassis 12 and drive axle 22.

Although pivot member 72 may be mounted at substantially any position along elongated rocker arms 46 and 48, it is highly advantageous and especially preferred that mounting member 72 be mounted at a position removed or away from center point 54. Mounting the pivot mount away from center point 54 causes a "preloading" of either the front portion or rear portion of the vehicle in which the system is installed, thereby reducing the load distribution on either the front or rear wheels associated with the system (not necessarily the vehicle, depending on the number of wheels). This, in turn, assists in reducing turf "scuffing", especially during turning Also, such preloading eases the act of turning the vehicle from the operator's standpoint. It is especially preferred to have preloading in the range of about 55–65% of the load distribution to the rear of the system/vehicle, especially about a 60% preloading.

In operation, a vehicle utilizing the drive/suspension system of the invention can provide all of the additional requirements of all-terrain/utility type vehicles and also achieves a surprising degree of ability to reduce turf scuffing, ease turning of the vehicle and provide improved ground clearance for enhanced operation of the vehicle. Application of power from any type of drive device such as gasoline engine, diesel engine, electric motor or the like is transferred through the drive shaft (not shown) to universal joint 40 and into the gear system in axle housing 24. Driving motion is transmitted through axle shaft 26 toward drive sprockets 32 and 34. Further drive action is transmitted through chain 62 to sprockets 60, through axles 58 and to the wheels (not shown). Reduction between the engine shaft and the wheels is preferably achieved within the gear reduction of axle housing 24. Additional reduction can be achieved by utilizing different-sized sprockets 60 in comparison to other drive sprockets 32 and 34. Preferably, there is about a 5% reduction between the sets of sprockets.

The unique drive/suspension system of the invention allows all-terrain/utility type vehicles to avoid traditional suspension systems based on leaf springs, coil springs, shock absorbers or the like as typically configured. The resulting structure is far stronger and less subject to inordinate wear, yet provides a comparatively soft ride for the cargo and/or passengers by virtue of the utilization of the dampers 66.

Use of the drive/suspension system of the invention in a six-wheeled vehicle is especially advantageous. Its advantages are in direct relation to other six-wheeled vehicles, wherein either one or both of the rear drive axles are rigid to the frame. The advantage to the invention system is that all four drive wheels have an independent action to the chassis, thereby providing 1) consistent traction in uneven terrain by allowing all four wheels to engage the ground at all times, and 2) a smoother ride to the passengers since the floating axles average out a lot of the bumps in the terrain (for example, driving over a 6" diameter log only raises the chassis about 3", due to the ratio of the pivot arms.

Although this invention has been described in connection with specific forms thereof, it will be appreciated that a wide variety of equivalents may be substituted for the specific elements described herein without departing from the spirit and scope of the invention as described in the appended claims. For example, although a drive chain 62 having openings sized and shaped to receive teeth has been shown in conjunction with sprockets 32, 34, 60, 62 and 64, all having teeth, other components may be used. As an example, a pulley and belt system can be used as well as any number of other drive/linking systems known in the art. Thus, although the term "sprocket" is used herein to refer to use of such sprockets with teeth, its definition is sufficiently broad to cover other configurations, constructions and components such as the aforementioned pulleys and the like so long as the component is rotatable and capable of engaging a drive belt, chain or link of some type.

Also, although gas/piston type shock absorbers utilized as dampeners 66 are shown as the preferred embodiment, other types of dampeners may be used. For example, coil springs or similar devices may be used.

What is claimed is:

1. A vehicle drive/suspension system comprising:

a chassis having a front portion, a rear portion a first side and a second side;

a drive axle having opposed end portions extending between said first and second sides;

first and second elongated rocker arms, each having opposed end portions, said first and second rocker arms connected respectively to each of said opposed end portions of said drive axle and pivotally mounted to each of said first and second sides substantially at said opposed end portions of said drive axle;

a sprocket rotatably fixed to each of said opposed end portions of said rocker arms;

a rotatable drive sprocket connected to each of said opposed end portions of said drive axle;

a drive link for each arm connected to rotate said sprockets in conjunction with said drive sprockets; and a tension sprocket mounted on each of said rocker arms and connected to said drive link.

2. The vehicle drive/suspension system of claim 1 further comprising a dampener connected between an opposed end portion of each of said rocker arms and said chassis.

3. The vehicle drive/suspension system of claim 2 wherein said dampeners are shock absorbers.

4. The vehicle drive/suspension system of claim 1 further comprising a brake associated with each of said drive sprockets.

5. The vehicle drive/suspension system of claim 1 wherein said tension sprockets are slidably fixed to said rocker arms.

6. The vehicle drive/suspension system of claim 1 further comprising a rubber stop member mounted on each side of said chassis and in alignment with corresponding ones of said rocker arms.

7. The vehicle drive/suspension system of claim 1 further comprising i) a pivot plate extending from said chassis toward said drive axle, ii) a pivot mount associated with each of said rocker arms and iii) a pivot pin extending through each of said pivot mounts, corresponding ones of said pivot plates and into corresponding ones of said opposed end portions of said drive axle.

8. The vehicle drive/suspension system of claim 7 wherein said pivot pins threadingly engage said opposed end portions of said drive axle.

9. The vehicle drive/suspension system of claim 1 wherein each of said rocker arms has a middle point located equidistant from ends thereof and wherein said rocker arms are pivotally mounted to said opposed end portions of said drive axle at locations away from said middle points.

10. The vehicle drive/suspension system of claim 9 wherein said rocker arms are pivotally mounted at locations that cause about 55–65% of the weight of said system to be biased toward said rear portion.

11. The vehicle drive/suspension system of claim 1 wherein said drive axle is positioned below said sides.

12. The vehicle drive/suspension system of claim 1 wherein said drive link is a chain.

13. A vehicle drive/suspension system comprising:

a chassis having a front portion, a rear portion a first side and a second side;

a drive axle having opposed end portions extending between said first and second sides;

first and second elongated rocker arms, each having opposed end portions and a pivot point, respectively pivotally mounted to each of said first and second sides at said pivot points and connected to said opposed end portions of said drive axle, said pivot points being located at positions other than middle points along the length of said rocker arms;

a sprocket rotatably fixed to each of said opposed end portions of said rocker arms;

a rotatable drive sprocket connected to each of said opposed end portions of said drive axle;

a drive link for each arm connected to rotate said sprockets in conjunction with said drive sprockets; and a tension sprocket mounted on each of said rocker arms and connected to said drive link.

14. The vehicle drive/suspension system of claim 13 further comprising a dampener connected between an opposed end portion of each of said rocker arms and said chassis.

15. The vehicle drive/suspension system of claim 14 wherein said dampeners are shock absorbers.

16. The vehicle drive/suspension system of claim 13 further comprising a brake associated with each of said drive sprockets.

17. The vehicle drive/suspension system of claim 13 wherein said tension sprockets are slidably fixed to said rocker arms.

18. The vehicle drive/suspension system of claim 13 further comprising a rubber stop member mounted on each side of said chassis and in alignment with corresponding ones of said rocker arms.

19. The vehicle drive/suspension system of claim 13 further comprising i) a pivot plate extending from said chassis toward said drive axle, ii) a pivot mount associated with each of said rocker arms and iii) a pivot pin extending through each of said pivot mounts, corresponding ones of said pivot plates and into corresponding ones of said opposed end portions of said drive axle.

20. The vehicle drive/suspension system of claim 19 wherein said pivot pins threadingly engage said opposed end portions of said drive axle.

21. The vehicle drive/suspension system of claim 13 wherein said rocker arms are pivotally mounted at locations that cause about 55–65% of the weight of said system to be biased toward said rear portion.

22. The vehicle drive/suspension system of claim 13 wherein said drive axle is positioned below said sides.

23. The vehicle drive/suspension system of claim 13 wherein said drive link is a chain.

* * * * *